(12) United States Patent
Lin et al.

(10) Patent No.: US 9,075,272 B2
(45) Date of Patent: Jul. 7, 2015

(54) LIQUID CRYSTAL DISPLAY PANEL HAVING POSITIVE BLUE PHASE LIQUID CRYSTAL LAYER

(75) Inventors: Szu-Yu Lin, Taipei (TW); Cheng-Yeh Tsai, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 276 days.

(21) Appl. No.: 13/610,872

(22) Filed: Sep. 12, 2012

(65) Prior Publication Data

US 2014/0028958 A1 Jan. 30, 2014

(30) Foreign Application Priority Data

Jul. 26, 2012 (TW) .............................. 101127059 A

(51) Int. Cl.
*G02F 1/1343* (2006.01)
*G02F 1/137* (2006.01)
*G02F 1/1362* (2006.01)

(52) U.S. Cl.
CPC ..... *G02F 1/134363* (2013.01); *G02F 2001/13706* (2013.01); *G02F 2001/134372* (2013.01); *G02F 1/13624* (2013.01); *G02F 2001/13793* (2013.01)

(58) Field of Classification Search
CPC .......... G02F 2001/13793; G02F 2001/134372; G02F 2001/13706; G02F 1/133707; G02F 1/134363; G02F 2001/134318
USPC ............................................ 349/142–144, 48
See application file for complete search history.

(56) References Cited

U.S. PATENT DOCUMENTS

| | | | |
|---|---|---|---|
| 7,202,928 B2 * | 4/2007 | Lee et al. | 349/141 |
| 7,365,820 B2 | 4/2008 | Chae et al. | |
| 7,619,707 B2 * | 11/2009 | Wang et al. | 349/129 |
| 7,940,359 B2 * | 5/2011 | Lee | 349/138 |
| 8,144,302 B2 * | 3/2012 | You et al. | 349/158 |
| 2011/0075073 A1 * | 3/2011 | Oiwa et al. | 349/76 |
| 2012/0127416 A1 * | 5/2012 | Morishita et al. | 349/141 |
| 2012/0327346 A1 * | 12/2012 | Tsai et al. | 349/138 |

FOREIGN PATENT DOCUMENTS

| | | |
|---|---|---|
| CN | 102368126 | 3/2012 |
| TW | I279766 | 4/2007 |
| TW | I291050 | 12/2007 |
| TW | 201044062 | 12/2010 |
| TW | 201207519 | 2/2012 |

* cited by examiner

*Primary Examiner* — Paisley L Arendt
(74) *Attorney, Agent, or Firm* — Jianq Chyun IP Office

(57) ABSTRACT

A liquid crystal display panel including a first substrate, a second substrate, pixel structures and a positive blue phase liquid crystal layer disposed between the first substrate and the second substrate is provided. The second substrate is disposed opposite to the first substrate. The pixel structures are disposed on the first substrate and between the first substrate and the second substrate. Each pixel structure includes a first electrode, a dielectric layer, a second electrode, and a third electrode. The first electrode is disposed on the first substrate. The dielectric layer covers the first electrode. The second electrode is disposed on the dielectric layer, overlapped with the first electrode and electrically connected to the first electrode. The third electrode is disposed on the dielectric layer and overlapped with the first electrode. The third electrode substantially surrounds the second electrode. The third electrode is spaced apart a distance from the second electrode.

14 Claims, 7 Drawing Sheets

LIQUID CRYSTAL DISPLAY PANEL HAVING POSITIVE BLUE PHASE LIQUID CRYSTAL LAYER

CROSS-REFERENCE TO RELATED APPLICATION

This application claims the priority benefit of Taiwan application serial no. 101127059, filed on Jul. 26, 2012. The entirety of the above-mentioned patent application is hereby incorporated by reference herein and made a part of this specification.

BACKGROUND

1. Field of the Invention

The invention relates to a display panel, and more particularly to, a liquid crystal display panel.

2. Description of Related Art

In 1888 A.D., Friedrich Reinitzer placed a cholesteric benzoate in a polarizing microscope and observed that the cholesteric benzoate would appear in different colors (blue-violet and blue) as in phases of isotropic and cholesteric, and a color variation phenomenon between the isotropic and cholesteric phases is only existed in a very small temperature interval (about a temperature interval of 1° C.). In 1970 A.D., many scientists confirmed the above-mentioned phenomenon is a new thermodynamically stable phase using methods, such as volumetric analysis, high resolution differential scanning calorimetry and so forth.

General liquid crystal is optically anisotropic, but the blue phase liquid crystal is, instead, optically isotropic. In other words, the blue phase liquid crystal has a very low or even does not have a birefringence. Nevertheless, since the periodic lattice of the blue phase is a function of visible light wavelength, a selective bragg reflection would occur. This feature enables the blue phase liquid crystal to be applied in the use of light modulators with a rapid response rate. However, regardless in terms of a theoretical prediction or an experimental observation, the blue phase liquid crystal only appears in molecular materials possessing high purity and high chirality, causing the blue phase liquid crystal to only exist within a very small temperature interval (a temperature interval smaller than 2° C.). Therefore, a practical application of the blue phase liquid crystal is rather difficult.

In recent decade, in order to enable the display quality of the liquid crystal display panel to override the quality of the cathode ray tube display, the blue phase liquid crystal with a rapid response characteristic is further subjected to academic and industry attentions. For the application need, the blue phase liquid crystal must possess a wide temperature application range; and therefore, different technical developments have successively been provided. For example, the polymer having a stable characteristic (producing polymer reticular structure) is being used to produce a blue phase which can exist within a wide temperature interval (Nature materials, 2002, 1, 64). In addition, in 2002 A.D., Kikuchi et al. successfully produced a blue phase with a temperature interval of 60° C. by adding a small amount of monomer and photoresist into the blue phase liquid crystal, and illuminating the mixture in the temperature range of the blue phase so as to produce a gel structure like stable blue phase.

Generally, the positive blue phase liquid crystal molecules are driven by a transverse electric field generated by an electrode design of in-plane switch mode (IPS), so that the positive blue phase liquid crystal molecules are formed as ellipsoids with birefringence. Under a circumstance without applying the electric field thereto, the positive blue phase liquid crystal molecules are optically isotropic. Under a circumstance of applying the electric field thereto, the positive blue phase liquid crystal molecules are optically anisotropic. Accordingly, when the display having the positive blue phase liquid crystal molecules is designed as a normally black type, the display would present in a bright screen under the circumstance of applying the electric field to the positive blue phase liquid crystal molecules and present in a black state under the circumstance without applying the electric field to the positive blue phase liquid crystal molecules. However, the electrodes with a coplanar design, e.g. the IPS-mode design, usually are the comb-like electrodes with a fixed pitch, no transverse electric field is existed above the electrode, so that the positive blue phase liquid crystal molecules right above the electrode are not driven by the transverse electric field to present the optically isotropic characteristic, thus having low transmittance and causing dark lines in the screen, such that the display quality of the liquid crystal display panel is negatively affected. In addition, the positive blue phase liquid crystal molecules in the literatures are displayed with a driving voltage, for example, as high as about 35 volts, and thus are harmful to a chip design of a driver circuit.

SUMMARY OF THE INVENTION

The invention provides a liquid crystal display panel having a favorable transmittance and capable of driving by a low driving voltage.

The invention provides a liquid crystal display panel including a first substrate, a second substrate, a plurality of pixel structures, and a positive blue phase liquid crystal layer. The second substrate is disposed opposite to the first substrate. The pixel structures are disposed on the first substrate and between the first substrate and the second substrate. Each pixel structure includes a first electrode, a dielectric layer, at least a second electrode, and at least a third electrode. The first electrode is disposed on the first substrate. The dielectric layer covers the first electrode. The second electrode is disposed on the dielectric layer and overlapped with the first electrode, and the second electrode is electrically connected to the first electrode. The third electrode is disposed on the dielectric layer and overlapped with the first electrode, wherein the third electrode substantially surrounds the second electrode and is spaced apart a distance from second electrode. The positive blue phase liquid crystal layer is disposed between the first substrate and the second substrate. The positive blue phase liquid crystal layer includes a plurality of positive blue phase liquid crystal molecules.

The invention further provides a liquid crystal display panel including a first substrate, a second substrate, a plurality of pixel structures, and a liquid crystal layer. The second substrate is disposed opposite to the first substrate. The pixel structures are disposed on the first substrate and between the first substrate and the second substrate. Each pixel structure includes a first electrode, a dielectric layer, at least a second electrode, and at least a third electrode. The first electrode is disposed on the first substrate. The dielectric layer covers the first electrode. The second electrode is disposed on the dielectric layer, overlapped with the first electrode, and electrically connected to the first electrode. The third electrode is disposed on the dielectric layer and overlapped with the first electrode, wherein the third electrode substantially surrounds second electrode and is spaced apart a distance the second electrode. The liquid crystal layer is disposed between the first substrate and the second substrate. The liquid crystal layer includes a plurality of positive liquid crystal molecules.

According to the foregoing, in the pixel structures of the liquid crystal display panel in the invention, the third electrode substantially surrounds the second electrode, and thus a plurality of electric fields having different directions may be formed between the second electrode and the third electrode to drive the positive liquid crystal molecules. Therefore, a transmittance of the liquid crystal display panel may be enhanced, and a driving voltage thereof may be declined.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
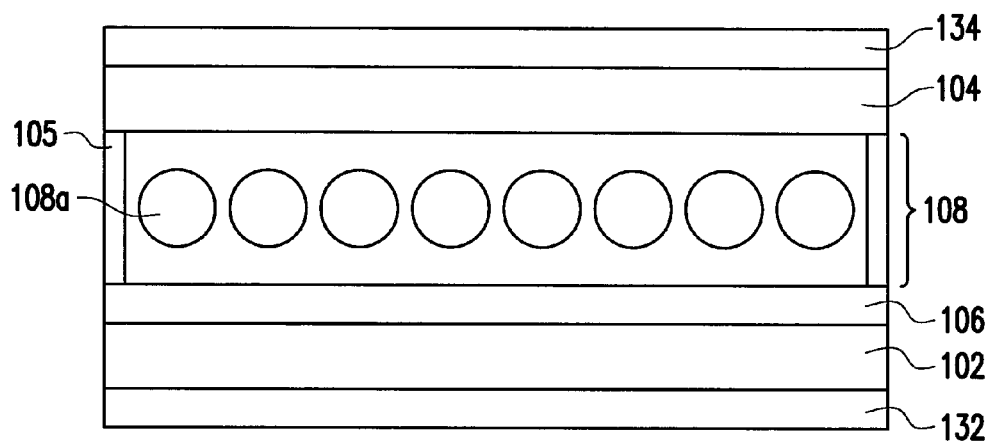
FIG. 1 is a schematic cross-sectional view illustrating a liquid crystal display panel according to an embodiment.

FIG. 1 is a schematic cross-sectional view illustrating a liquid crystal display panel according to an embodiment. Referring to FIG. 1, a liquid crystal display panel 100 includes a first substrate 102, a second substrate 104, a pixel array 106, and a positive blue phase liquid crystal layer 108. The second substrate 104 is disposed opposite to the first substrate 102. The pixel array 106 is disposed on the first substrate 102 and between the first substrate 102 and the second substrate 104. The positive blue phase liquid crystal layer 108 is disposed between the first substrate 102, the second substrate 104 and a sealant 105, the positive blue phase liquid crystal layer 108 includes a plurality of positive blue phase liquid crystal molecules 108a, and the positive blue phase liquid crystal molecules 108a may be, for example, polymer stable positive blue phase liquid crystal molecules having a larger operation temperature range, which is apparent to those people skilled in the art, and thus is not described in detail.

Figure 2:
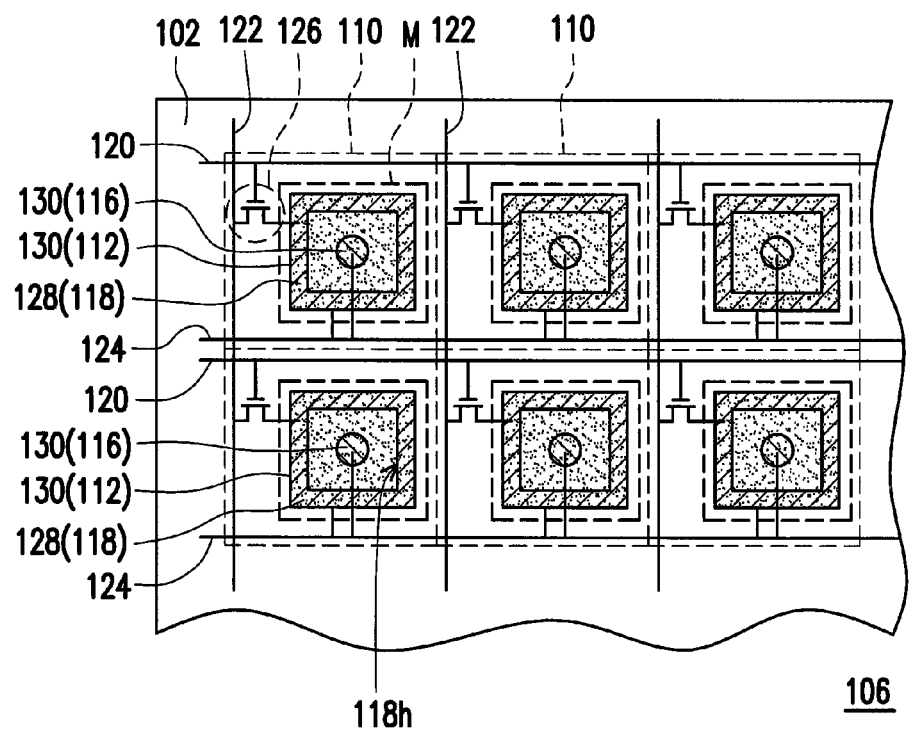
FIG. 2 is a schematic top view illustrating a pixel array of the embodiment.
Figure 3:
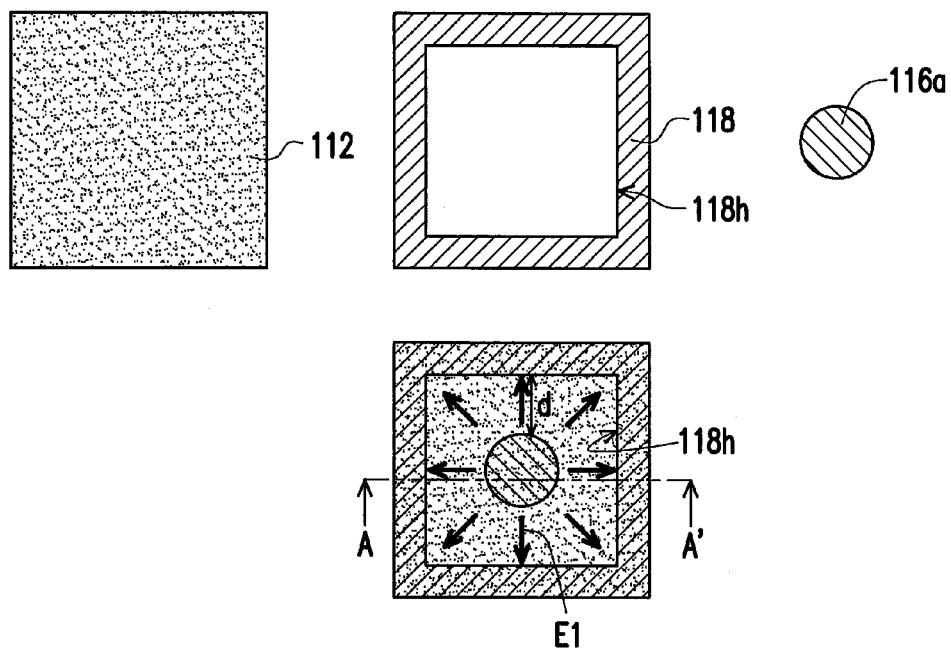
FIG. 3 is a schematic diagram illustrating a portion M of the pixel structures in FIG. 2.
Figure 4:
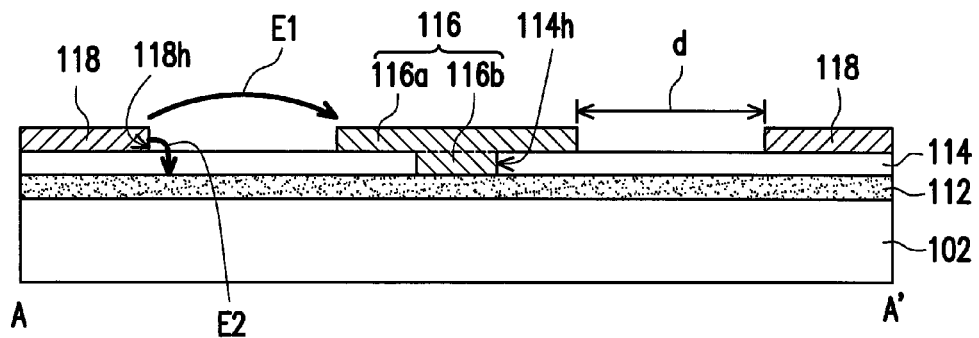
FIG. 4 is a schematic cross-sectional view of the pixel structure having the electrode configuration depicted in FIG. 3 along a line A-A' of FIG. 3.

FIG. 2 is a schematic top view illustrating a pixel array of the embodiment. Referring to FIG. 2, the pixel array 106 includes a plurality of pixel structures 110 arranged in array. Herein, one of the pixel structures 110 is used as an example for the purpose of description, those people skilled in the art would be able to understand the designs of other pixel structures 110 after referring to the instruction of this pixel structure 110. FIG. 3 is a schematic diagram illustrating a portion M of the pixel structures in FIG. 2, wherein some of the components are omitted in FIG. 3 so as to clearly illustrate a configuration relationship of certain film layers. FIG. 4 is a schematic cross-sectional view of the pixel structure having the electrode configuration depicted in FIG. 3 along a line A-A' of FIG. 3. Concurrently referring to FIG. 2, FIG. 3 and FIG. 4, each pixel structure 110 includes a first electrode 112, a dielectric layer 114, at least a second electrode 116, and at least a third electrode 118, wherein the first electrode 112 is, for example, represented with a dotted pattern, the second electrode 116 is, for example, represented with left slash pattern, and the third electrode 118 is, for example, represented with a right slash pattern. A material of the first electrode 112, the second electrode 116 and the third electrode 118 can be a conductive material or a transparent conductive material, such as an indium tin oxide, an indium zinc oxide, and other similar transparent conductive material. Certainly, in other embodiments, the material of the first electrode 112, the second electrode 116 and the third electrode 118 may respectively be a metal or other conductive material.

Particularly, it can be known from FIG. 4, the first electrode 112 is disposed on the first substrate 102, and the second electrode 116 is electrically connected to the first electrode 112. The dielectric layer 114 covers the first electrode 112, and the dielectric layer 114 has an opening 114h. The second electrode 116 is disposed on the dielectric layer 114 and overlapped with the first electrode 112. Specifically, the second electrode 116 covers a part of the dielectric layer 114 at the periphery of the opening 114h, and the second electrode 116 penetrates the opening 114h of the dielectric layer 114 to be in contact with the first electrode 112; therefore, the second electrode 116 is electrically connected to the first electrode 112. Viewing from another perspective, the second electrode 116 may be divided into an electrode portion 116a and a connecting portion 116b. The electrode portion 116a covers the connecting portion 116b and covers a part of the dielectric layer 114 at the periphery of the opening 114h. The connecting portion 116b is located in the opening 114h of the dielectric layer 114, so as to electrically connect the electrode portion 116a with the first electrode 114. The second electrode 116 may also be electrically connected to first electrode 112 via other methods, but the invention is not limited thereto.

The third electrode 118 is disposed on the dielectric layer 114 and overlapped with a portion of the first electrode 112. In FIG. 3, the third electrode 118 substantially surrounds the second electrode 116, and the third electrode 118 is spaced apart a distance d from the second electrode 116. The third electrode 118 is not electrically connected to the second electrode 116. Viewing from another perspective, the third electrode 118 has at least an opening 118h, such as a circular opening, and the second electrode 116 is correspondingly located in the opening 118h and substantially surrounded by the third electrode 118. Specifically, it is more favorable for the electrode portion 116a in the second electrode 116 and the third electrode 118 to be located on a same plane parallel to the first substrate 102, namely, located in a coplanar manner on a surface of the dielectric layer 114 which is away from the first substrate 102. In addition, the third electrode 118 and the second electrode 116 may also be located on different planes.

In the present embodiment, a horizontal electric field E1 parallel to the first substrate 102 may be formed between the electrode portion 116a of the second electrode 116 and the third electrode 118, which are located on the same plane. The horizontal electric field E1 may be used to drive the positive blue phase liquid crystal molecules 108a in the positive blue phase liquid crystal layer 108 illustrated in FIG. 1, which means the liquid crystal molecules 108a are driven by a driving electric field of the horizontal direction. In addition, referring to FIG. 3, since the third electrode 118 is disposed surrounding the second electrode 116, the horizontal electric fields E1 having the vectors with different directions, for example in radial direction, may be formed between the second electrode 116 and the third electrode 118. As a result, the positive blue phase liquid crystal molecules 108a may have a multi-domain orientation for increasing a viewing angle of the liquid crystal display panel 100. Noteworthily, the electrode design in the present embodiment would have an ideal or a better transmittance.

Furthermore, a fringe electric field E2 may be formed between the third electrode 118 and the first electrode 112 on the different planes. The fringe electric field E2 may also be used to drive the positive blue phase liquid crystal molecules 108a in the positive blue phase liquid crystal layer 108, so as to concurrently provide a horizontal and an oblique electric field driving effects. As a result, the positive blue phase liquid crystal molecules 108a may be effectively driven through the horizontal electric fields E1 and the fringe electric field E2, so as to lower driving voltage of the liquid crystal display panel 100.

Referring to FIG. 2 and FIG. 4 again, in order to realize the driving of the pixel structure 110, the pixel array 106 in the present embodiment further includes a plurality of scan lines 120, a plurality of data lines 122 and a plurality of common electrode lines 124. In addition, each pixel structure 110 substantially includes an active device 126, a pixel electrode 128 and a common electrode 130. The active device 126 is driven by one of the scan lines 120 to electrically connect the pixel electrode 128 with one of the data lines 122. The common electrode 130 is then connected to the corresponding common electrode line 124. The active device 126 is, for example, a thin film transistor, and a detail structure thereof is well-known by those people skilled in the art, and thus is not repeated herein.

In an embodiment, the first electrode 112 and the second electrode 116 are, for example, formed as a common electrode 130 and are electrically connected to the common electrode line 124 to have common voltages. The third electrode 118 is, for example, a pixel electrode 128 and is electrically connected to the active device 126. For instance, the second electrode 116 is electrically connected to the common electrode line 124 through the first electrode 112 located between the dielectric layer 114 and the first substrate 102. In the present embodiment, the second electrode 116 is correspondingly located within the opening 118h of the third electrode 118, and the electrode portion 116a of the second electrode 116 and the third electrode 118 are located on the same plane. As a result, the horizontal electric fields E1 and the fringe electric field E2 are generated to drive the positive blue phase liquid crystal molecules 108a through providing different voltages to the pixel electrode 128 and the common electrode 130. In addition, a storage capacitor may be formed with an overlapping portion between the first electrode 112 and the third electrode 118. In FIG. 2, it is to be noted that the connecting line between the first electrode 112 and the common electrode line 124, the connecting line between the second electrode 116 and the common electrode line 124, and the connecting line between the third electrode 118 and the active device 126 are schematically used to indicate electrical connections, and do not require to represent an actual configuration of the metal conductive wires for those people skilled in the art.

Referring to FIG. 1 again, the liquid crystal display panel 100 in the present embodiment may further include a first polarizer 132 and a second polarizer 134. The first substrate 102, the pixel array 106 and the positive blue phase liquid crystal layer 108 are disposed between the first polarizer 132 and the second polarizer 134. Since the third electrode 118 substantially surrounds the second electrode 116 in the present embodiment, a radial electric field in the horizontal direction can be formed between the second electrode 116 and the third electrode 118. Accordingly, the first polarizer 132 is, for example, a circular polarizer, and the second polarizer 134 is, for example a circular polarizer. A transmittance of light may be enhanced by combining the electrode design of the present embodiment with the circular polarizer.

Figure 5:
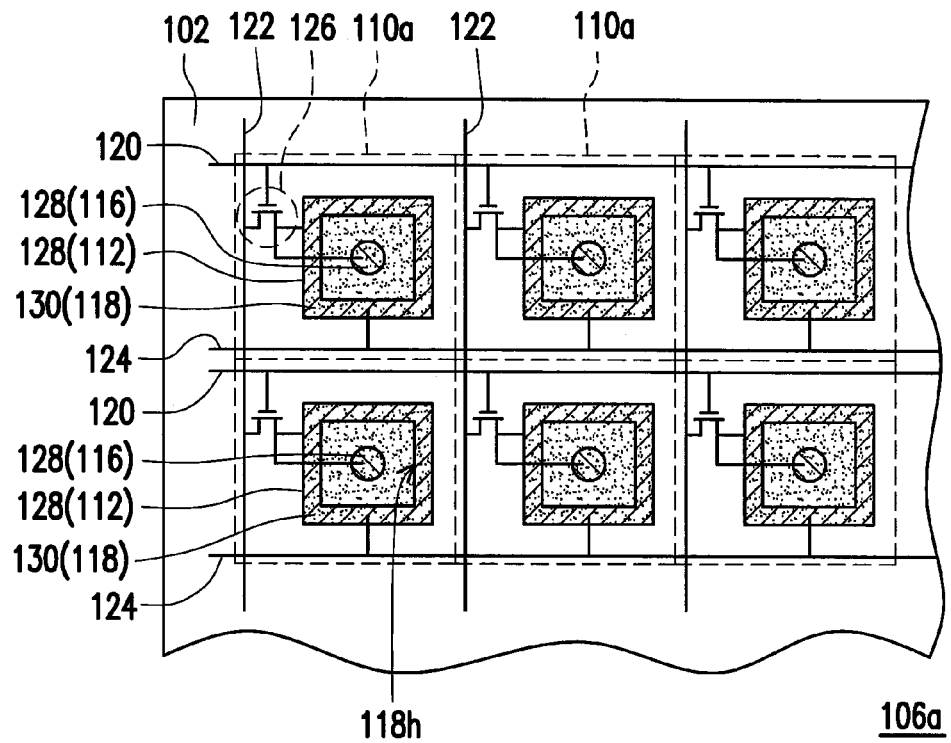
FIG. 5 is a schematic top view illustrating a pixel array according to an embodiment.

In the previous embodiment, the first electrode 112 and the second electrode 116 are formed as the common electrode 130, and the third electrode 118 is the pixel electrode 128. However, the invention is not limited thereto. In another embodiment, the first electrode 112 and the second electrode 116 may be formed as the pixel electrode 128, and the third electrode 118 may be the common electrode 130, as shown in FIG. 5. Specifically, in the pixel array 106a shown in FIG. 5, the first electrode 112 and the second electrode 116 of the pixel structure 110a are electrically connected to the active device 126. The third electrode 118 is electrically connected to the common electrode line 124 to have the common voltage. For instance, a relationship between the first electrode 112, the second electrode 116 and the third electrode 118 on the cross-section is as illustrated in FIG. 4, the second electrode 116 is, for example, electrically connected to the active device 126 through the first electrode 112 located between the dielectric layer 114 and the first substrate 102. Accordingly, the second electrode 116 may be correspondingly located within the opening 118h of the third electrode 118, and the electrode portion 116a of the second electrode 116 may located on the same plane as the third electrode 118, which is namely located in a coplanar manner on the surface of the dielectric layer 114. As a result, the horizontal electric field E1 and the fringe electric field E2 with different directions, through providing different voltages to the pixel electrode 128 and the common electrode 130, are able to be formed to drive the positive blue phase liquid crystal molecules 108a. In addition, the storage capacitor may be formed with an overlapped portion between the first electrode 112 and the third electrode 118. In FIG. 5, it is to be noted that the connecting line between the first electrode 112 and the active device 126, the connecting line between the second electrode 116 and the active device 126, and the connecting line between the third electrode 118 and the common electrode line 124 are only used to indicate the electrical connections, and do not require to represent the actual configuration of the metal conductive wires for those people skilled in the art.

Figure 6:
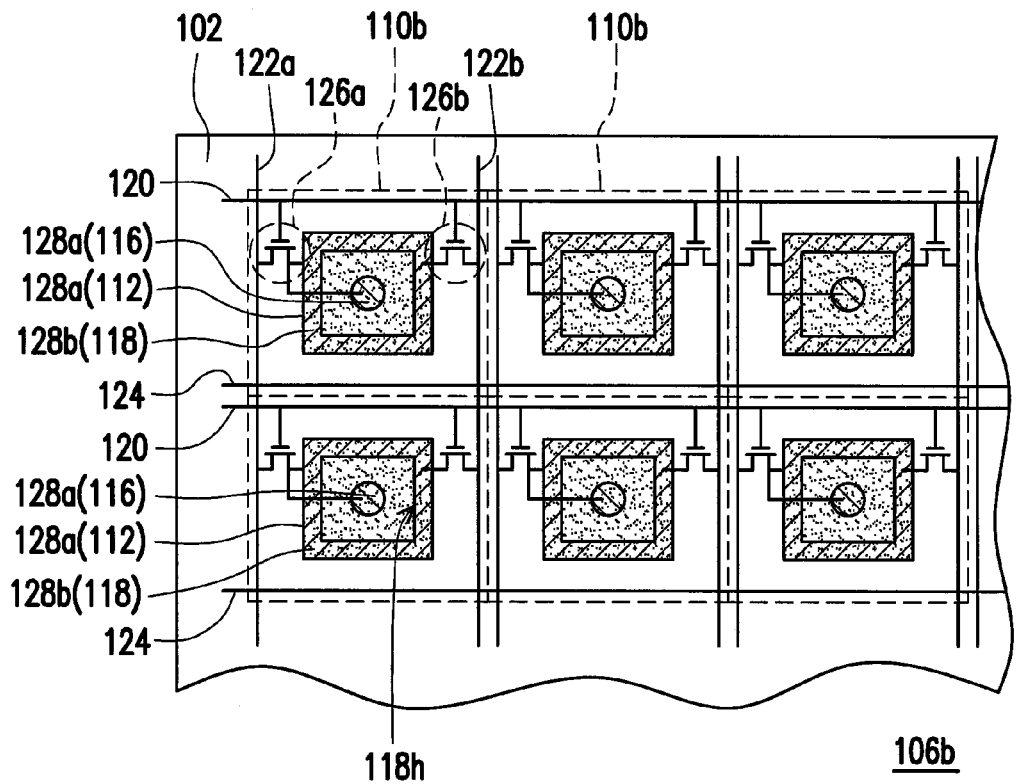
FIG. 6 is a schematic top view illustrating a pixel array according to an embodiment.

In addition, in an embodiment, the first electrode 112 and the second electrode 116 may be formed as a first pixel electrode 128a, and the third electrode 118 may be a second pixel electrode 128b, as shown in FIG. 6. Specifically, in the pixel array 106b shown in FIG. 6, the pixel array 106b includes a plurality of first data lines 122a and a plurality of second data lines 122b, and each pixel structure 110b includes a first active device 126a and a second active device 126b. The first electrode 112 and the second electrode 116 are electrically connected to the first active device 126a. The third electrode 118 is electrically connected to the second active device 126b. A relationship between the first electrode 112, the second electrode 116 and the third electrode 118 on the cross-section is as illustrated in FIG. 4, and the second electrode 116 is, for example, electrically connected to the first active device 126a through the first electrode 112 located between the dielectric layer 114 and the first substrate 102. Accordingly, the second electrode 116 may be correspondingly located within the circular opening 118h of the third electrode 118, and the electrode portion 116a of the second electrode 116 may be located on the same plane as the third electrode 118. As a result, the horizontal electric field E1 and the fringing electric field E2 with different directions, through providing different voltages to the first pixel electrode 128a and the second pixel electrode 128b, are able to be formed to drive the positive blue phase liquid crystal molecules 108a. In FIG. 6, it is to be noted that the connecting line between the first electrode 112 and the first active device 126a, the connecting line between the second electrode 116 and the first active device 126a, and the connecting line between the third electrode 118 and the second active device 126b are only used to indicate the electrical connections, and do not necessarily represent the actual configuration of the metal conductive wires.

Figure 7:
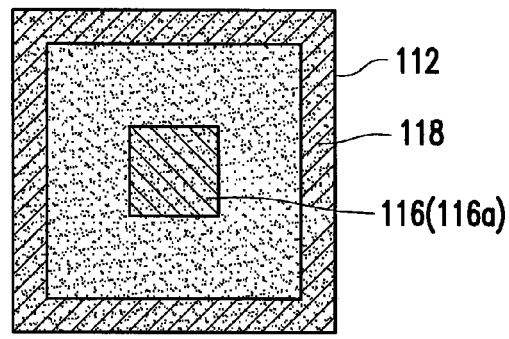
FIG. 7 is a schematic configuration diagram of a first electrode, a second electrode and a third electrode according to an embodiment.
Figure 8:
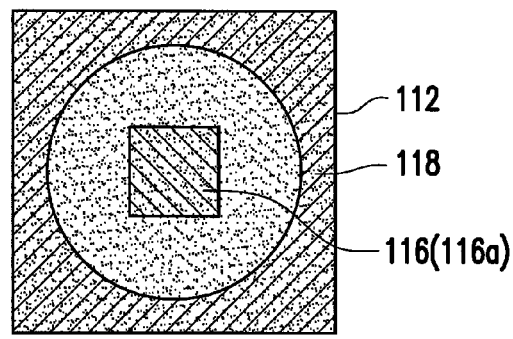
FIG. 8 is a schematic configuration diagram of a first electrode, a second electrode and a third electrode according to an embodiment.
Figure 9:
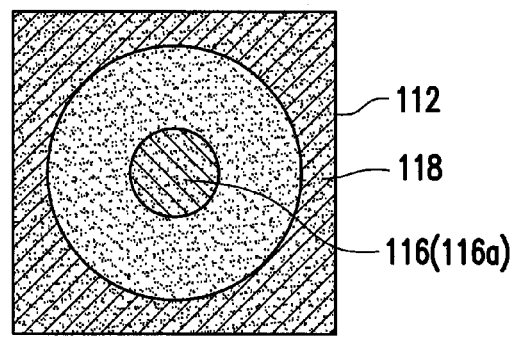
FIG. 9 is a schematic configuration diagram of a first electrode, a second electrode and a third electrode according to an embodiment.
Figure 10:
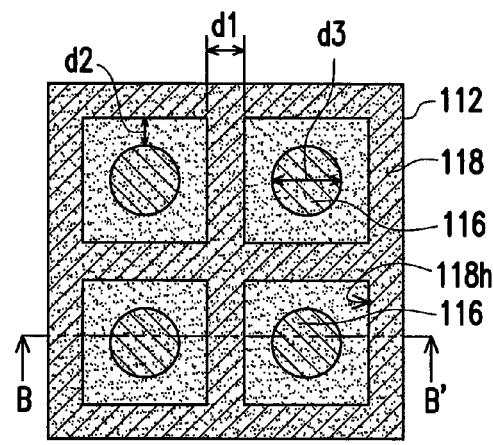
FIG. 10 is a schematic configuration diagram of a first electrode, a second electrode and a third electrode according to an embodiment.
Figure 11:
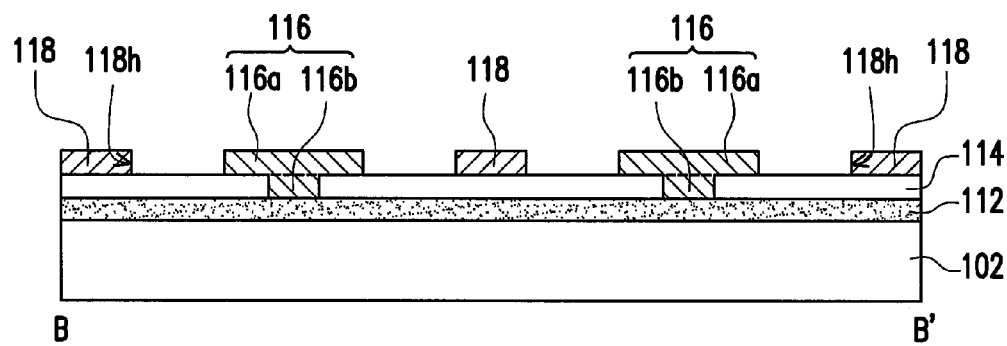
FIG. 11 is a schematic cross-sectional view of the electrode configuration depicted in FIG. 10 along a line B-B'.

In the previous embodiments, the electrode portion 116a of the second electrode 116 is a circular electrode, and the third electrode 118 is a rectangular frame-shaped electrode. However, the invention is not limited thereto. In an embodiment, the electrode portion 116a of the second electrode 116 may be the rectangular electrode, and the third electrode 118 may be the rectangular frame-shaped electrode, as shown in FIG. 7. In addition, in another embodiment, the electrode portion 116a of the second electrode 116 may be a rectangular electrode, and the third electrode 118 may be a circular frame-shaped electrode, as shown in FIG. 8. In addition, in still yet another embodiment, the electrode portion 116a of the second electrode 116 is the circular electrode, and the third electrode 118 is the circular frame shaped-electrode, as shown in FIG. 9. Noteworthily, the invention does not limit the shape of the first electrode 112; and as long as the first electrode 112 is overlapped with the second electrode 116 while the first electrode 112 is electrically connected to the second electrode 116 through the connecting portion 116b penetrating the dielectric layer 114, then a configuration relationship such that the second electrode 116 is located within the close opening of the third electrode 118 and the second electrode 116 is not electrically connected to the third electrode 118 may be realized, Moreover, in previous embodiments, each pixel structure 110 includes a first electrode 112, a second electrode 116 and a third electrode 118. However, the invention is not limited thereto. In an embodiment, a pixel structure 110 may include a first electrode 112, a plurality of second electrodes 116 and a third electrode 118 therein, as shown in FIG. 10. FIG. 11 is a schematic cross-sectional view of the pixel structure depicted in FIG. 10 along a line B-B'. Referring to FIG. 10 and FIG. 11, the third electrode 118 may includes a plurality of close type openings 118h. Each second electrode 116 is correspondingly located within one of the close type openings 118h. In the embodiment illustrated in FIG. 11, the electrode portion 116a of the second electrode 116 and the third electrode 118 are located on the dielectric layer 114 and can be located on a same plane, and the first electrode 112 and the third electrode 118 can be located on different planes. In relative to a driving approach between the first electrode 112, the second electrode 116 and the third electrode 118 may be referred to the previous embodiment, and thus is not repeated herein. Noteworthily, since one pixel structure 110 includes a plurality of second electrodes 116, and each positive blue phase liquid crystal molecule 108a located between the second electrode 116 and the third electrode 118 may have a multi-regional orientation, a favorable wide viewing angle effect may further be achieved. In addition, in another embodiment, one pixel structure 110 may further include a plurality of third electrodes 118. In other words, the invention does not limit the amounts of the first electrode 112, the second electrode 116 and the third electrode 118.

Figure 12:
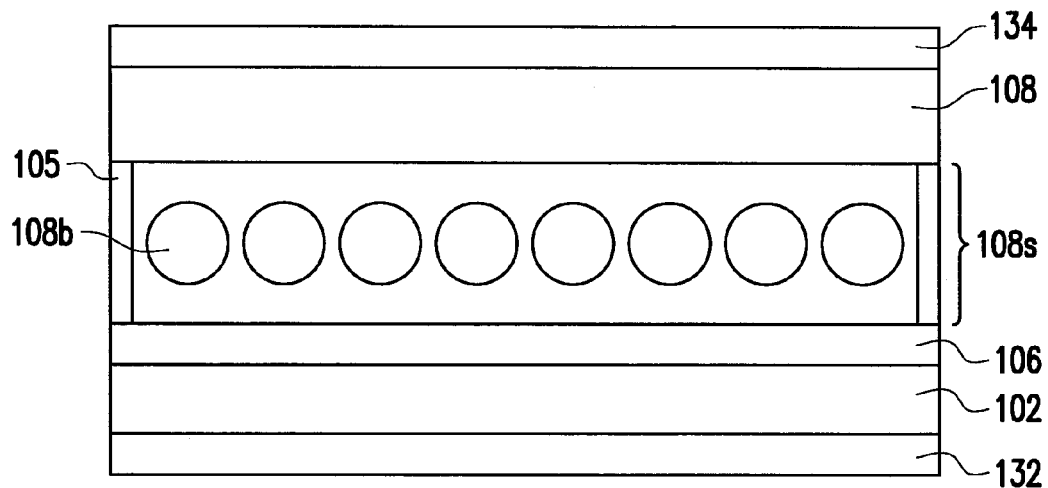
FIG. 12 is a schematic cross-sectional view illustrating a liquid crystal display panel according to an embodiment.

In addition, in the previous embodiments, the positive blue phase liquid crystal layer 108 is used as an example for the purpose of descriptions. However, the invention is not limited thereto. Any positive liquid crystal layer 108s, as long as, including the positive liquid crystal molecules 108b may be applied into the invention, as shown in FIG. 12.

Evaluation of the Liquid Crystal Display Panel

It is referred to the structure shown in FIG. 10 for the electrode design in the pixel structures of the liquid crystal display panels of Example 1 and Example 2. The design parameters of Example 1 and Example 2 may be referred to Table 1, wherein d1 is a width of the third electrode, d2 is a minimum distance between the second electrode and the third electrode, and d3 is a diameter of the second electrode. The electrode design in the pixel structure of the liquid crystal display panel of Comparison Example 1 is a design of conventional comb electrode.

TABLE 1

|  | d1 | d2 | d3 |
|---|---|---|---|
| Example 1 | 3 | 2.75 | 3.5 |
| Example 2 | 2.5 | 3.25 | 3.5 |

Figure 13:
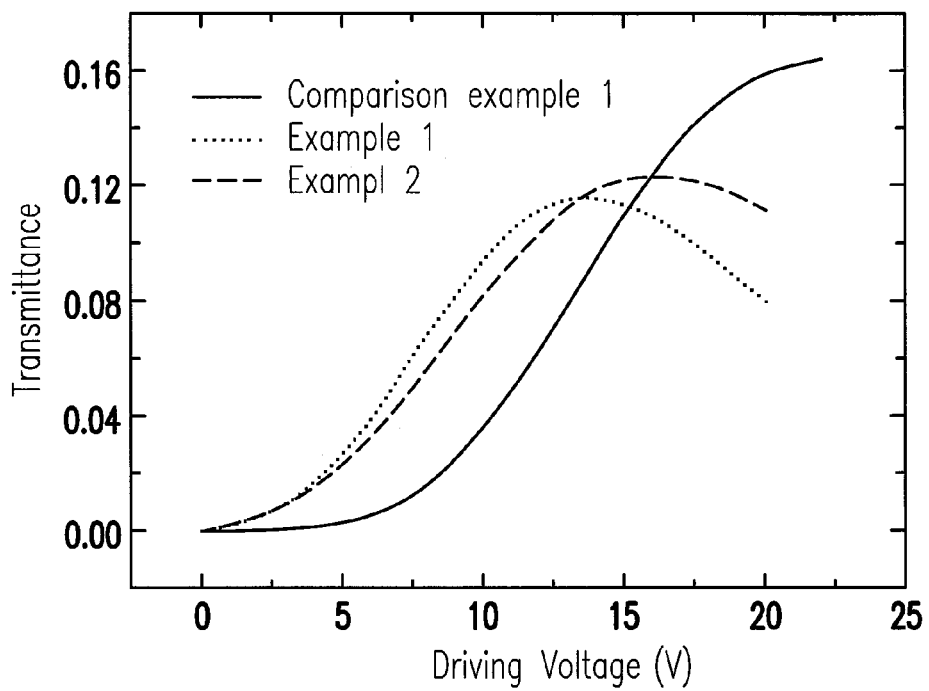
FIG. 13 is a correlation diagram of transmittance vs. driving voltage of the liquid crystal display panels according an example 1, an example 2 and a comparison example 1.

FIG. 13 is a correlation diagram of transmittance vs. driving voltage of the liquid crystal display panels according an example 1, an example 2 and a comparison example 1. It may be known from FIG. 13, saturation driving voltages of the liquid crystal display panels of Example 1 and Example 2 are both smaller than a saturation driving voltage of the liquid crystal display panel of Comparison Example 1. It is apparent that liquid crystal display panels having the electrode design of the invention may have a lower driving voltage and are facilitative in reducing the burden of a driver chip.

Furthermore, it may be known from the above-mentioned embodiment, a single pixel structure may be configured with two active devices for respectively driving the first electrode and the third electrode that are electrically connected to the second electrode. At this moment, the voltage difference between the first electrode and the third electrode may be equal to a maximum tolerant voltage value of the driver chip while not limited by a value of the common voltage. For instance, when the maximum tolerant voltage value of the driver chip is 8 volts, the voltages of the first electrode and the third electrode may respectively be the minimum voltage (i.e. 0 voltage) and the maximum voltage (i.e. 8 voltage) of the driver chip in the pixel structure with the two active devices. At this moment, the voltage difference between the first electrode and the third electrode may reach about 8 volts. However, when the pixel structure is driven with only one active device, the common voltage is usually set as half of the maximum tolerant voltage value of the driver chip, which is about 4 volts. At this moment, a largest voltage difference between the first electrode and the third electrode may reach up to about 4 volts. In comparison, when the driving voltage needed by the liquid crystal molecules is larger, the design of the single pixel structure having two active devices may drive the liquid crystal molecules more effectively.

Figure 14B:
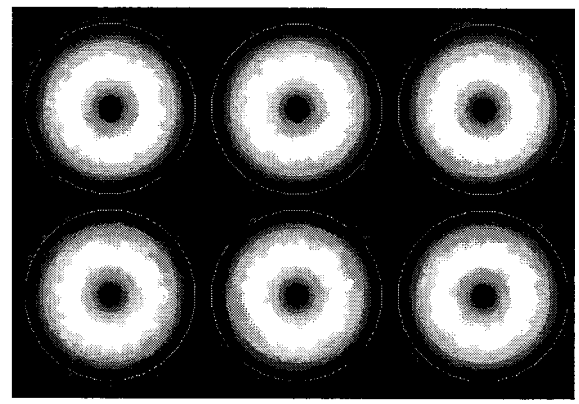
FIG. 14B represents an illuminated liquid crystal display panel having an electrode design in pixel structures shown in FIG. 9 and the liquid crystal display panel is disposed with a pair of circular polarizers.
Figure 14A:
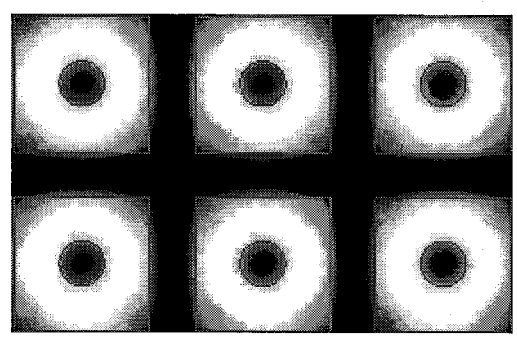
FIG. 14A represents an illuminated liquid crystal display panel having an electrode design in pixel structures shown in FIG. 10 and the liquid crystal display panel is disposed with a pair of circular polarizers.

Moreover, FIGS. 14A and 14B represent an illuminated liquid crystal display panel having the electrode design in pixel structures shown in FIG. 9 and FIG. 10 and the liquid crystal display panel is disposed with a circular polarizer. It may be know from FIGS. 14A and 14B, by utilizing the electrode design according to the invention, the liquid crystal display panel has an ideal display aperture rate (illuminating area).

In summary, in the pixel structures of the liquid crystal display panel in the invention, the first electrode and the second electrode composed of different film layers are electrically connected to each other, and the third electrode substantially surrounds the second electrode, so that the second electrode and the third electrode having different voltages are located on a same horizontal plane. Thus, the horizontal electric fields of different directions may be formed between the second electrode and third electrode to drive the positive liquid crystal molecules. Accordingly, the transmittance of the liquid crystal display panel may be enhanced, and the driving voltage thereof may be declined. Furthermore, the first electrode and the third electrode located between the different planes may have the fringe electric field to further drive the positive liquid crystal molecules, so that the transmittance of the liquid crystal display panel may be enhanced.

It will be apparent to those people skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A liquid crystal display panel comprising:
   a first substrate;
   a second substrate disposed opposite to the first substrate;
   a plurality of pixel structures disposed on the first substrate and between the first substrate and the second substrate, each pixel structure comprising:
      a first electrode disposed on the first substrate;
      a dielectric layer covering the first electrode;
      at least a second electrode disposed on the dielectric layer, overlapped with the first electrode, and electrically connected to the first electrode;
      at least a third electrode disposed on the dielectric layer and overlapped with the first electrode, wherein the third electrode substantially surrounds the second electrode in a closed-loop form and is spaced apart a distance from the second electrode; and
   a positive blue phase liquid crystal layer disposed between the first substrate and the second substrate, wherein the positive blue phase liquid crystal layer comprises a plurality of positive blue phase liquid crystal molecules plurality of positive blue phase liquid crystal molecules,
   wherein the first electrode and the second electrode comprise a first pixel electrode, and the third electrode comprises a second pixel electrode.

2. The liquid crystal display panel as recited in claim 1, wherein each pixel structure further comprises a first active device and a second active device, the first active device is electrically connected to the first electrode, and the second active device is electrically connected to the third electrode.

3. The liquid crystal display panel as recited in claim 2, wherein each pixel structure further comprise a scan line, a first data line and a second data line, the first active device is electrically connected to the scan line and the first data line, and the second active device is electrically connected to the scan line and the second data line.

4. The liquid crystal display panel as recited in claim 1 further comprising a first polarizer and a second polarizer, wherein the first substrate, the pixel structures, the positive blue phase liquid crystal layer, and the second substrate are disposed between the first polarizer and the second polarizer.

5. The liquid crystal display panel as recited in claim 4, wherein each of the first polarizer and the second polarizer comprises a circular polarizer.

6. The liquid crystal display panel as recited in claim 1, wherein the dielectric layer has an opening for electrically connecting the second electrode to the first electrode by the second electrode passing through the opening.

7. The liquid crystal display panel as recited in claim 1, wherein the third electrode is not electrically connected to the second electrode.

8. A liquid crystal display panel comprising:
   a first substrate;
   a second substrate disposed opposite to first substrate;
   a plurality of pixel structures disposed on the first substrate and between the first substrate and the second substrate, each pixel structure comprising:
      a first electrode disposed on the first substrate;
      a dielectric layer covering the first electrode;
      at least a second electrode disposed on the dielectric layer, overlapped with the first electrode, and electrically connected to first electrode;
      at least a third electrode disposed on the dielectric layer and overlapped with the first electrode, wherein the third electrode substantially surrounds the second electrode in a closed-loop form and is spaced apart a distance from the second electrode; and
   a positive liquid crystal layer disposed between the first substrate and the second substrate, wherein the positive liquid crystal layer comprises a plurality of positive liquid crystal molecules crystal molecules,
   wherein the first electrode and the second electrode comprise a first pixel electrode, and the third electrode comprises a second pixel electrode.

9. The liquid crystal display panel as recited in claim 8, wherein each pixel structure further comprises a first active device and a second active device, the first active device is electrically connected to the first electrode, and the second active device is electrically connected to the third electrode.

10. The liquid crystal display panel as recited in claim 9, wherein each pixel structure further comprises a scan line, a first data line and a second data line, the first active device is electrically connected to the scan line and the first data line, and the second active device is electrically connected to the scan line and the second data line.

11. The liquid crystal display panel as recited in claim 8 further comprising a first polarizer and a second polarizer, wherein the first substrate, the pixel structures, the positive liquid crystal layer, and the second substrate are disposed between the first polarizer and the second polarizer.

12. The liquid crystal display panel as recited in claim 11, wherein each of the first polarizer and the second polarizer comprises a circular polarizer.

13. The liquid crystal display panel as recited in claim 8, wherein the dielectric layer has an opening for electrically connecting the second electrode to the first electrode by the second electrode passing through the opening.

14. The liquid crystal display panel as recited in claim 8, wherein the third electrode is not electrically connected the second electrode.

* * * * *